United States Patent
Holtgrewe et al.

(10) Patent No.: US 10,329,465 B2
(45) Date of Patent: Jun. 25, 2019

(54) EPOXY RESIN COMPOSITION

(71) Applicants: Christian Holtgrewe, Duesseldorf (DE); Harald Kuester, Duesseldorf (DE); Thomas Bachon, Duesseldorf (DE); Rainer Schoenfeld, Duesseldorf (DE)

(72) Inventors: Christian Holtgrewe, Duesseldorf (DE); Harald Kuester, Duesseldorf (DE); Thomas Bachon, Duesseldorf (DE); Rainer Schoenfeld, Duesseldorf (DE)

(73) Assignee: Henkel AG & Co. KGaA, Duesseldorf (DE)

(*) Notice: Subject to any disclaimer, the term of this patent is extended or adjusted under 35 U.S.C. 154(b) by 44 days.

(21) Appl. No.: 15/626,266

(22) Filed: Jun. 19, 2017

(65) Prior Publication Data

US 2017/0321094 A1    Nov. 9, 2017

Related U.S. Application Data

(63) Continuation of application No. PCT/EP2015/080329, filed on Dec. 17, 2015.

(30) Foreign Application Priority Data

Dec. 22, 2014   (DE) .......................... 10 2014 226826

(51) Int. Cl.
| | |
|---|---|
| B32B 27/38 | (2006.01) |
| C09J 163/00 | (2006.01) |
| C08G 59/20 | (2006.01) |
| C08G 59/18 | (2006.01) |
| C08G 59/50 | (2006.01) |
| C08L 63/00 | (2006.01) |
| C09J 11/08 | (2006.01) |

(52) U.S. Cl.
CPC ............ *C09J 163/00* (2013.01); *B32B 27/38* (2013.01); *C08G 59/184* (2013.01); *C08G 59/186* (2013.01); *C08G 59/504* (2013.01); *C08L 63/00* (2013.01); *C09J 11/08* (2013.01); *C08G 2650/50* (2013.01)

(58) Field of Classification Search
None
See application file for complete search history.

(56) References Cited

U.S. PATENT DOCUMENTS

| | | | |
|---|---|---|---|
| 3,985,703 A | 10/1976 | Ferry et al. | |
| 4,180,529 A | 12/1979 | Hofmann | |
| 4,315,085 A | 2/1982 | Ozari et al. | |
| 4,419,496 A | 12/1983 | Henton et al. | |
| 4,778,851 A | 10/1988 | Henton et al. | |
| 5,223,586 A | 6/1993 | Mautner et al. | |
| 5,290,857 A | 3/1994 | Ashida et al. | |
| 5,534,594 A | 7/1996 | Troy et al. | |
| 5,686,509 A | 11/1997 | Nakayama et al. | |
| 5,789,482 A | 8/1998 | Eldin et al. | |
| 5,981,659 A | 11/1999 | Geck et al. | |
| 6,015,865 A * | 1/2000 | Blank .................... | C08G 59/10 525/524 |
| 6,111,015 A | 8/2000 | Eldin et al. | |
| 6,147,142 A | 11/2000 | Geck et al. | |
| 6,180,693 B1 | 1/2001 | Tang et al. | |
| 6,331,580 B1 | 12/2001 | Molnar | |
| 2005/0124761 A1 | 6/2005 | Schultes et al. | |
| 2005/0143496 A1 | 6/2005 | Mueller | |
| 2008/0188609 A1* | 8/2008 | Agarwal ................ | C08L 51/04 524/504 |
| 2012/0142817 A1 | 6/2012 | Swarup et al. | |
| 2015/0284608 A1 | 10/2015 | Hofstetter et al. | |

FOREIGN PATENT DOCUMENTS

| | | |
|---|---|---|
| DE | 198 45 607 | 4/2000 |
| DE | 10 2007 027595 | 12/2008 |
| EP | 0 169 066 | 1/1986 |
| WO | 2008/016889 | 2/2008 |
| WO | 2011/123356 | 10/2011 |
| WO | 2012/110230 | 8/2012 |
| WO | 2013/086277 | 6/2013 |
| WO | 2013/151835 | 10/2013 |

OTHER PUBLICATIONS

International Search Report issued in connection with International Patent Application No. PCT/EP2015/080329 dated Mar. 11, 2016.

* cited by examiner

*Primary Examiner* — Michael J Feely
(74) *Attorney, Agent, or Firm* — Steven C. Bauman

(57) ABSTRACT

The present invention relates to adhesive compositions containing a prepolymer which can be obtained by reacting a reaction mixture containing: at least one epoxy resin; at least one polyetherdiamine or polyethertriamine; at least one carboxyl-terminated butadiene-acrylonitrile copolymer (CTBN); and rubber particles having a core/shell structure. The invention also relates to methods for curing said compositions, to the cured adhesive compositions thus obtained, to the use thereof for bonding components and to the components thus obtained.

9 Claims, No Drawings

EPOXY RESIN COMPOSITION

The present invention relates to adhesive compositions based on epoxy resin, and to cured compositions obtainable therefrom which are characterized by low moduli of elasticity and high glass transition temperatures, and to methods for the production thereof.

In the automobile industry, but also in other fields, adhesives based on epoxy resin are widely known and are used for example to bond together components which are made of the same or similar materials, such as aluminum for example. However, when bonding different materials, such as for example carbon fiber-reinforced composites or glass fiber-reinforced composites and metals such as steel or aluminum, stresses can occur due to the differences in the materials, in particular the different thermal expansion coefficients thereof. Therefore, for bonding different materials such as this, it is advantageous to use adhesives which have low moduli of elasticity in the cured state. Although such adhesives are known, these often have disadvantages in terms of their mechanical strength and performance and lower glass transition temperatures. Particularly for industrial adhesives, however, it is desirable to have glass transition temperatures that are as high as possible.

It is known, for example, to use plasticizers to lower the modulus of elasticity of an epoxy resin adhesive, which typically has a modulus of elasticity in the range from 1600 to 2000 MPa. However, such plasticizers also reduce the glass transition temperature. Suitable plasticizers used are, for example, polyurethane-capped prepolymers or CTBN epoxy resin adducts. By way of example, international patent publication WO 2007/025007 discloses adhesive compositions which contain rubber particles having a core/shell structure, further impact modifiers, inter alia epoxy polyetheramine adducts and polyurethanes, epoxy resin and a curing agent. The compositions disclosed therein nevertheless have the aforementioned disadvantages, since they very considerably reduce the glass transition temperature.

There is therefore still a need for adhesives based on epoxy resin which overcome the aforementioned disadvantages.

It has now surprisingly been found that cured adhesive compositions having low moduli of elasticity of <500 MPa and high glass transition temperatures of >100° C. can be obtained by curing an adhesive composition containing a prepolymer which is formed by reacting a reaction mixture containing: at least one epoxy resin; at least one polyetherdiamine or polyethertriamine; at least one carboxyl-terminated butadiene-acrylonitrile copolymer (CTBN); and rubber particles having a core/shell structure.

In a first aspect, the present invention therefore relates to an adhesive composition comprising a prepolymer which can be obtained by reacting a reaction mixture containing:
(a) at least one epoxy resin;
(b) at least one polyetherdiamine or polyethertriamine;
(c) at least one carboxyl-terminated butadiene-acrylonitrile copolymer (CTBN); and
(d) rubber particles having a core/shell structure.

In a further aspect, the invention relates to methods for producing a cured adhesive composition, wherein the method comprises providing an adhesive composition described herein and then partially or fully curing the adhesive composition through exposure to conditions suitable for curing the adhesive composition.

In yet another aspect, the invention relates to a cured adhesive composition which can be obtained by partially or fully curing the adhesives described herein. In various embodiments, such cured compositions have a modulus of elasticity <800 MPa and a glass transition temperature of >100° C.

Finally, the invention also relates to a method for bonding at least two components, which comprises:
(a) applying an adhesive composition as described herein to one or both of the components to be bonded;
(b) bringing the components into contact such that the adhesive composition is located between the two components; and
(c) partially or fully curing the adhesive composition through exposure to conditions suitable for curing the adhesive composition, and to the components which can thus be obtained.

As used herein, "at least one" refers to 1 or more, for example 1, 2, 3, 4, 5, 6, 7, 8, 9 or more. In connection with constituents of the adhesive compositions described herein, this figure refers not to the absolute amount of molecules, but rather to the type of constituent. Therefore, "at least one epoxy resin" means for example one or more different epoxy resins, that is to say one or more different types of epoxy resin. Together with specified amounts, the amounts stated refer to the total amount of the designated type of constituent, as already defined above.

As used herein in connection with numerical values, "approximately" refers to the referenced numerical value ±10%, preferably ±5%.

Where reference is made herein to molecular weights, the figures relate to the number-average molecular weight $M_n$, unless indicated otherwise.

The term "prepolymer", as used herein interchangeably with the term "prepolymerized mixture", refers to prepolymerized compositions having the stated constituents, in which the various constituents have already been partially or fully reacted with one another.

It is generally advantageous that the modulus of elasticity of epoxy resin adhesives, as used in automobile construction, is such that materials having different thermal expansion coefficients can be efficiently and permanently bonded to one another. It is preferred in this case that the modulus of elasticity is as low as possible. In various embodiments, therefore, the cured adhesive compositions of the invention have moduli of elasticity of less than 800 MPa, preferably less than 600 MPa, more preferably less than 500 MPa. On the other hand, it is preferred that the modulus of elasticity is at least 100 MPa, preferably at least 300 MPa, more preferably at least 400 MPa.

The glass transition temperature of the cured compositions is preferably higher than the process or ambient temperatures to which the components are exposed after bonding. It is therefore preferred that the glass transition temperature of the cured compositions described herein is as high as possible, that is to say preferably >100° C., particularly preferably >110° C.

To this end, the adhesive compositions of the present invention contain a prepolymer which can be obtained by reacting:
(a) at least one epoxy resin;
(b) at least one polyetherdiamine or polyethertriamine;
(c) at least one carboxyl-terminated butadiene-acrylonitrile copolymer (CTBN); and
(d) rubber particles having a core/shell structure.

In addition to said pre-formed prepolymer, the adhesive compositions usually contain at least one curing agent, in particular a (heat-activatable) latent curing agent, and optionally in addition customary auxiliaries and additives, such as fillers, adhesion promoters, accelerators, colorants, propellants, etc.

The epoxy resins used in the adhesive compositions described herein may very generally be all epoxy resins which have at least two 1,2-epoxy groups per molecule. Such polyepoxides may be saturated, unsaturated, cyclic or acyclic, aliphatic, alicyclic, aromatic or heterocyclic polyepoxide compounds. Examples of suitable polyepoxides include polyglycidyl ethers, such as for example those which can be prepared by reacting epichlorohydrin or epibromohydrin with a polyphenol in the presence of a base. Suitable polyphenols include, but are not limited to, resorcinol, pyrocatechol, hydroquinone, bisphenol A (bis-(4-hydroxyphenyl)-2,2-propane), bisphenol F (bis-(4-hydroxyphenyl)methane), bis-(4-hydroxyphenyl)-1,1-isobutane, 4,4'-dihydroxybenzophenone, bis-(4-hydroxyphenyl)-1,1-ethane and 1,5-hydroxynaphthalene. Further suitable polyphenols are the known condensation products of phenol and formaldehyde or acetaldehyde of the novolak type.

Further polyepoxides which are also suitable in principle are the polyglycidyl ethers of polyalcohols or diamines. Suitable polyalcohols are for example ethylene glycol, diethylene glycol, triethylene glycol, 1,2-propylene glycol, 1,4-butylene glycol, 1,5-pentanediol, 1,6-hexanediol or trimethylolpropane.

Further suitable polyepoxides are the polyglycidyl esters of polycarboxylic acids, for example the reaction products of glycidol or epichlorohydrin with aliphatic or aromatic polycarboxylic acids, such as oxalic acid, succinic acid, glutaric acid, terephthalic acid or dimeric fatty acids.

Further epoxides are derived from the epoxidation products of olefinically unsaturated cycloaliphatic compounds from natural oils or fats.

However, particular preference is given to liquid epoxy resins, in particular those obtained by reacting bisphenol A or bisphenol F and epichlorohydrin. Such epoxy resins, which are liquid at room temperature (20°; 1013 mbar), typically have epoxy equivalent weights of approximately 150 to approximately 480. Products of this type are commercially available (Dow Chemicals) for example as D.E.R. 331, having an epoxy equivalent weight of approximately 180 to 195 g/mol, or D.E.R. 332, having an epoxy equivalent weight of approximately 170 to 175 g/mol.

Alternatively, however, use can also be made of epoxy resins which are solid at room temperature and which can be obtained by reacting polyphenols with epichlorohydrin. Particular preference is also given here to those based on bisphenol A or bisphenol F having melting points in the range from 45 to 130° C., preferably 50 to 80° C. They differ from the liquid epoxy resins essentially by their higher molecular weight and usually have epoxy equivalent weights ≥400.

The reaction mixture used to produce the prepolymer typically contains approximately 25 to approximately 60% by weight, in particular 30 to 55% by weight, of the at least one epoxy resin. Unless indicated otherwise, all percentages herein refer to % by weight.

The epoxy resins described above are reacted with at least one polyetherdiamine or polyethertriamine; at least one carboxyl-terminated butadiene-acrylonitrile copolymer (CTBN); and rubber particles having a core/shell structure. By reacting the epoxy resins with the polyetheramine, polyetheramine-epoxy adducts are obtained, which are known in the prior art as impact modifiers (see for example WO 2007/025007). The production of such adducts from epoxides and amine-terminated polyethers is known in the prior art and is described for example in U.S. Pat. Nos. 5,084,532 and 6,015,865. In general, it is preferred to adjust the ratio of amine-terminated polyether:epoxy resin so that the epoxy groups are present in excess in relation to the amine groups, in order to ensure that the latter are fully reacted.

The amine-terminated polyethers used may be for example polyetherdiamines, polyethertriamines or mixtures thereof, preference being given to polyethertriamines. The amine-terminated polyethers may contain units of ethylene oxide, propylene oxide or both, for example in the form of copolymers. The polyetheramines contain at least two amino groups per molecule. The amino groups are preferably primary amino groups, and the polyethers are preferably aliphatic polyethers. The polyetheramines may be linear, branched or a mixture thereof, but branched polyetheramines are preferred. In various embodiments, the polyetheramines used have molecular weights Mn in the range from 200 to 6000 g/mol, preference being given to those having $M_n$ greater than 1000, more preferably 3000 or more. Molecular weights of 3000 and 5000 are particularly preferred.

As polyetheramines, use may be made for example of the following:
1. linear amine-terminated polyoxyethylene ethers of formula:

where n is preferably 17 to 27.
2. linear amine-terminated polyoxypropylene ethers of formula:

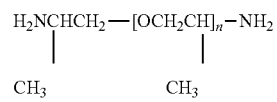

or isomers thereof, where n is preferably 5 to 100. Such compounds are commercially available for example from Huntsman Chemical under the trade name Jeffamine® (D, ED and DR series). These include Jeffamine® D-230, D-400, D-2000, D-4000, HK-511, ED-600, ED-900, ED-2003, EDR-148 and EDR-176. In various embodiments, the average molecular weight $M_n$ of such amine-terminated polyoxypropylene ethers may vary from approximately 300 to approximately 5000.
3. trifunctional compounds of formula:

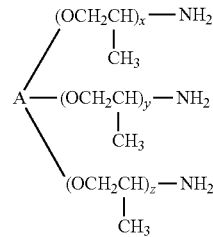

where A is

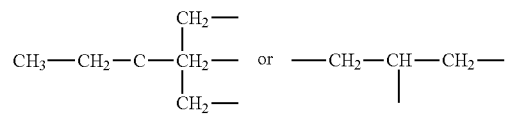

and x, y and z independently of one another are 1 to 40, and x+y+z is preferably >6. Such trifunctional compounds are commercially available for example from Huntsman Chemical under the trade name Jeffamine® (T series). In various embodiments, the average molecular weight $M_n$ of such trifunctional amine-terminated polyoxypropylene ethers may vary from approximately 300 to approximately 6000. Preference is given for example to Jeffamine® T3000 and Jeffamine® T5000, and particular preference is given to Jeffamine® T5000.

As already mentioned above, it is preferred that the epoxy groups are used in excess in relation to the amino groups, so that the latter are reacted as fully as possible. The epoxy groups are typically used in an at least 1.5-fold excess, for example in an at least 3.5-fold excess, in relation to the active hydrogen equivalents (AHEW) of the amine-terminated polyethers. The reaction is preferably carried out at elevated temperature, for example at 90 to 130° C., in particular at around 120° C., for a duration of for example three hours.

According to the invention, the amine-terminated polyethers are typically used in amounts of 15 to 40% by weight, in relation to the total weight of the reaction mixture used to prepare the prepolymer. The resulting polyether-amine-epoxy adducts are contained in the adhesive formulation preferably in amounts of at least 3% by weight, more preferably at least 5% by weight, even more preferably at least 10% by weight, and up to 60% by weight, preferably up to 40% by weight, more preferably up to 20% by weight, in each case in relation to the total weight of the formulation.

The carboxyl-terminated butadiene-acrylonitrile copolymers (CTBN) used herein are likewise known in the prior art as impact modifiers. These are usually epoxy-reactive copolymers of butadiene with (meth)acrylonitrile. Such copolymers are available for example from Noveon under the trade name HYCAR®. Such copolymers can also be used as reaction products of the carboxyl-terminated butadiene-acrylonitrile copolymers with epoxy resins, as described for example in US patents US 2003/0196753 and U.S. Pat. No. 6,776,869. The CTBNs are used herein preferably in the form of reaction products with epoxy resins, particularly those as described above, that is to say in particular diglycidyl ethers of bisphenols. Such reaction products are available for example from Huntsman under the trade name Araldite® LT1522 ES.

If the carboxyl-terminated butadiene-acrylonitrile copolymers are not used in the form of prepolymers with epoxy resins, it is preferred that the epoxy groups are used in excess in relation to the epoxy-reactive groups. In this case, account must then be taken of the fact that the epoxy groups are used in excess in relation to the amino groups of the amine-terminated polyethers and the epoxy-reactive groups of the CTBNs, so that amino groups and epoxy-reactive groups are reacted as fully as possible. Here, too, the epoxy groups are typically used in a 1.5-fold to 10-fold excess, for example in a 3.5-fold excess, in relation to the active hydrogen equivalents (ANEW) of the epoxy-reactive groups, including the amino groups. The reaction can be carried out as described above in connection with the polyetheramine adducts.

The CTBN copolymers, in particular the CTBN-epoxy adducts, are typically used in amounts of 2 to 20% by weight, in particular 5 to 15% by weight, preferably 6-9% by weight, in each case in relation to the reaction mixture.

The rubber particles having a core/shell structure may be all particulate materials having a rubber core which are known and suitable for the purpose described herein. Preferred core/shell particle compositions are for example in U.S. Pat. Nos. 7,642,316 and 7,625,977. The rubber core preferably has a glass transition temperature $T_g$ below −25° C., more preferably below −50° C., and even more preferably below −70° C. The $T_g$ of the core may even be considerably below −100° C. The core/shell particles also have a shell portion which preferably a $T_g$ of at least 50° C.

Herein, "core" means the inner part of the particle. The core may be the center of the core/shell particle or an inner casing or domain of the particle. Herein, "casing" or "shell" means the part outside the core and usually forms the outer casing, that is to say the outermost part of the particle. The shell material is preferably grafted onto the core or crosslinked to the latter. The rubber core can account for 50 to 95% by weight, in particular 60 to 90% by weight of the particle.

The core of the particle may be a polymer or copolymer of a conjugated diene, such as for example butadiene, or a lower alkyl acrylate, such as for example n-butyl acrylate, ethyl acrylate, isobutyl acrylate or 2-ethylhexyl acrylate. The core polymer may additionally contain up to 20% by weight of further copolymerized monounsaturated monomers, such as styrene, vinyl acetate, vinyl chloride, methyl methacrylate and the like. The core polymer is optionally crosslinked. In certain embodiments, it contains up to 5% by weight of a copolymerized graft monomer which contains two or more unsaturated bonds with different reactivity, such as diallyl maleate, monoallyl fumarate, allyl methacrylate and the like, wherein at least one of the unsaturated bonds is not conjugated.

The core polymer may also be a silicone rubber. These materials often have glass transition temperatures below −100° C. Core/shell particles having such silicone rubber cores include those which are commercially available under the trade name Genioperl from Wacker Chemie (Munich, Germany).

The shell polymer, which is optionally grafted onto the core or crosslinked to the latter, is preferably a polymer of a lower alkyl methacrylate, such as methyl methacrylate, ethyl methacrylate or t-butyl methacrylate. Homopolymers of such methacrylates can be used. In addition, up to 40% by weight of the shell polymer may be formed of other vinyl monomers, such as styrene, vinyl acetate, vinyl chloride, methyl acrylate, ethyl acrylate, butyl acrylate and the like. The molecular weight of the grafted shell polymer is generally between 20,000 and 500,000.

The rubber particles usually have average particle sizes of from around 0.03 to around 2 micrometers or from around 0.05 to around 1 micrometer. In certain embodiments of the invention, the rubber particles have an average diameter of less than around 500 nm. In other embodiments, the average particle size is less than around 200 nm. For example, the core/shell rubber particles may have an average diameter in the range from around 25 to around 200 nm or from around 50 to 150 nm.

Methods for producing rubber particles having a core/shell structure are well known in the prior art and are described for example in U.S. Pat. Nos. 3,985,703, 4,180,529, 4,315,085, 4,419,496, 4,778,851, 5,223,586, 5,290,857, 5,534,594, 5,686,509, 5,789,482, 5,981,659, 6,111,015, 6,147,142 and 6,180,693, 6,331,580 and 2005/124,761.

The core/shell particles may have, in the shell polymer, reactive groups which can react with an epoxy resin or an epoxy resin curing agent. For example, glycidyl groups are suitable. Particularly preferred core/shell particles are those described in European patent application EP 1 632 533 A1. The core/shell particles described therein include a crosslinked rubber core, in most cases a crosslinked copolymer of butadiene, and a shell which is preferably a copolymer of styrene, methyl methacrylate, glycidyl methacrylate and optionally acrylonitrile.

In various embodiments, use is made of core/shell particles as also described in WO 2007/025007.

The rubber particles having a core/shell structure are preferably dispersed in a polymer or epoxy resin, as also described in the document cited above. Preferred core/shell particles include those available from Kaneka Corporation under the name Kaneka Kane Ace, including Kaneka Kane Ace 15 and the 120 product series, including Kaneka Kane Ace MX 153, Kaneka Kane Ace MX 156, Kaneka Kane Ace MX 257 and Kaneka Kane Ace MX 120 core/shell particle dispersions and mixtures thereof. These products contain the core/shell rubber particles pre-dispersed in an epoxy resin, with concentrations of approximately 33 or 25%.

The reaction mixtures contain the core/shell particles preferably in total amounts of 2% by weight to 30% by weight, in particular 5 to 20% by weight, in each case in relation to the total weight of the reaction mixture and the core/shell particles per se, that is to say without any dispersion medium.

The adhesive compositions of the invention contain the core/shell particles preferably in total amounts of at least 2% by weight, more preferably at least 5% by weight. In various embodiments, the amount of core/shell particles in the adhesive formulation is up to 25% by weight, typically up to 20% by weight.

As already described above, the adhesive compositions of the invention in various embodiments contain a prepolymer which can be prepared by reacting at least one epoxy resin with at least one polyetherdiamine or polyethertriamine. The reaction may in this case be carried out in the presence of at least one carboxyl-terminated butadiene-acrylonitrile copolymer (CTBN) or a reaction product of such a copolymer with an epoxy resin as well as rubber particles having a core/shell structure, optionally in the form of a dispersion in an epoxy resin and/or as epoxy-reactive core/shell particles. Mixtures are thus obtained which contain polyetherannine-epoxy adducts, CTBN-epoxy resin adducts and rubber particles having a core/shell structure, optionally in the form of core/shell particle-epoxy resin adducts, and copolymers thereof, such as for example polyetherannine-CTBN-epoxy resin adducts.

The inventors have surprisingly discovered that, by using such prepolymerized mixtures, it is possible to produce cured adhesive compositions which are characterized by low moduli of elasticity, in particular <500 MPa, and at the same time high glass transition temperatures of >100° C.

The adhesive compositions of the invention may moreover contain all additional constituents which are known and customary in the prior art. Such additional constituents include, but are not limited to, adhesion promoters, curing agents, fillers, propellants, plasticizers, diluents, reactive diluents, superplasticizers, coupling agents, wetting agents, flame retardants, viscosity control agents, preservatives, stabilizers and colorants.

As adhesion promoters, use may be made for example of chelate-modified epoxy resins as described for example in U.S. Pat. Nos. 4,702,962 and 4,340,716, European patent EP 342 035 and Japanese patent documents JP 58-063758 and JP 58-069265. Reaction products of epoxy resins and compounds containing chelating groups are also commercially available, for example as ADEKA resins EP-49-10N, EP-49-55C, EP-49-10, EP-49-20, EP-49-23 and EP-49-25 (Asahi Denka). Such adhesion promoters are typically contained in the adhesive composition in amounts of approximately 0.1 to 3% by weight in relation to the total weight of the formulation.

In various preferred embodiments, the adhesive compositions further contain at least one curing agent. Said curing agents are capable of crosslinking the constituents of the adhesive composition, optionally at elevated temperature, and thereby curing the composition. The curing agent is preferably activated by heating. The curing agent may act catalytically, but in preferred embodiments of the invention it participates directly in the curing process by reacting with one or more of the other constituents.

As heat-activated or latent curing agents, use may be made in the adhesive compositions of, for example, guanidines, substituted guanidines, substituted ureas, melamine resins, guanamine derivatives, cyclic tertiary amines, aromatic amines, or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine, and in particular cyanoguanidine (dicyandiamide). Examples of suitable guanamine derivatives include alkylated benzoguanamine resins, benzoguanamine resins, and methoxymethylethoxymethylbenzoguanamine. For one-component thermoset systems, the selection criterion is the low solubility of these substances in the resin system, and preference is therefore given to solid, finely ground curing agents; dicyandiamide is particularly suitable here. A good storage stability of the composition is thus ensured.

In addition to or instead of the aforementioned curing agents, use can also be made of catalytically active, substituted ureas. These are in particular p-chlorophenyl-N,N-dirnethylurea (monuron), 3-phenyl-1,1-dimethylurea (fenuron) or 3,4-dichlorophenyl-N,N-dimethylurea (diuron). In principle, use can also be made of catalytically active tertiary acrylamines or alkylamines, such as for example benzyldimethylamine, tris(dimethylamino)phenol, piperidine or piperidine derivatives, but these are usually too soluble in the resin system and are therefore disadvantageous with regard to storage stability. Use can also be made of various catalytically active, preferably solid imidazole derivatives. Examples are 2-ethyl-2-methylimidazole, N-butylimidazole, benzimidazole and N—$C_1$ to $C_{12}$ alkylimidazoles or N-arylimidazoles. Particular preference is given to combinations of curing agent and accelerator in the form of so-called accelerated dicyandiamides in finely ground form.

The amount of curing agent depends on a number of factors, but concentrations in the range from 0.5 to 8% by weight, in relation to the total weight of the formulation, are customary.

Suitable fillers include the various chalks, quartz powder, alumina, dolomite, carbon fibers, glass fibers, polymer fibers, titanium dioxide, silica, activated carbon, talc, calcium oxide, calcium magnesium carbonates, barium sulfate, and in particular silicate-like fillers of the aluminum-magnesium-calcium silicate type, such as for example wollastonite and chlorite. The compositions typically contain approximately 0.5 to approximately 10% by weight fillers.

In preferred embodiments, the compositions of the invention contain no plasticizers, or less than 0.1% by weight plasticizer, since these tend to lower the $T_g$.

The epoxy resin adhesives of the present invention can be used on many surfaces. Suitable materials include, but are not limited to, metals, such as aluminum and steel, thermoplastic polymers, such as polyethylene, polypropylene, polyurethane, polyacrylate and polycarbonate and copolymers thereof, thermoset polymers, such as vulcanized rubbers, urea-formaldehyde foams, melamine resins, wood, carbon fiber composites (CFCs), glass fiber composites (GFCs) and other composites. The epoxy resin adhesives can be used to bond together identical, similar or different materials, such as steel and steel, steel and aluminum, CFC and steel, CFC and aluminum, polycarbonate and vulcanized rubber, or aluminum and wood.

Epoxy resin adhesives of the invention are suitable for use in electrophoretic coating processes (e-coating), such as for example in the manufacture of automobile parts.

The present invention relates to the adhesive compositions in the uncured and cured state. The adhesive compositions may be one-component or two-component systems, particularly preferably one-component hot-melt systems. The invention also relates to the components bonded by the adhesive compositions described herein.

Also part of the invention are methods for producing cured adhesives, which comprise providing an adhesive composition described herein and then curing, wherein the curing may be partial or full and can take place by exposing the adhesive composition to conditions that bring about or enable curing. The latter may include for example heating to a particular temperature.

Finally, the invention also relates to manufacturing methods in which two components are bonded using the adhesive compositions described herein, and the composition is then partially or fully cured, and to the use of the compositions described herein for bonding at least two components.

The composition according to the invention can be applied to a substrate surface by means of methods known in the prior art. For example, it can be applied by extrusion or by mechanical application methods. In general, the adhesive is applied to one or both of the substrates to be joined. The substrates are brought into contact so that the adhesive is located between the substrates to be bonded to one another. The adhesive composition is then heated to a temperature at which the heat-curable or latent curing agent initiates the curing of the composition.

All embodiments disclosed in connection with the adhesive compositions are equally applicable to the cured formulations and to the described methods, and vice versa.

All cited documents are fully incorporated herein by way of reference.

The invention will be illustrated below by way of examples, but without being limited thereto.

EXAMPLES

Procedure:

To prepare the composition E1 according to the invention, the first four components of the formulation were mixed and pre-reacted at 120° C. for 2 h in vacuo in a planetary mixer. All further constituents of the formulation were added to the resulting highly viscous prepolymer at 60° C., and mixing took place in vacuo for 30 min. For the comparative example V1, only the first two constituents were pre-reacted by the same method to obtain the prepolymer.

The modulus of elasticity was determined according to DIN EN ISO 527, and the TG was determined by means of DMA in accordance with ISO 6721-11. Suitable test specimens, as described in the standards, were prepared in PTFE molds by curing the adhesive formulations for 30 minutes at 180° C.

TABLE 1

Adhesive compositions (amounts specified in % by weight)

|  | E1 | V1 |
|---|---|---|
| DER331 epoxy resin (Dow Chemical) (1) | 20.96 | 35 |
| Jeffamine T5000 (Huntsman) (2) | 21.8 | 16.5 |
| Araldite LT 1522 ES (Huntsman) (3) | 6.55 | — |
| Kane Ace MX-153 (Kaneka) (4) | 32.34 | 30 |
| Dyhard 100SH | 4.55 | 5.7 |
| Fenuron | 0.3 | 0.3 |
| Cab-o-Sil TS720 | 4.0 | 4.0 |
| Casiflux A25 | 5.0 | 5.0 |
| Glymo | 0.5 | 0.5 |
| Super 40 | 3.0 | 3.0 |
| Luzenac 2 | 1.0 | — |

E: according to the invention; V: comparative example

TABLE 2

| Properties | | |
|---|---|---|
|  | E1 | V1 |
| Young's modulus/MPa | 460 | 880 |
| $T_g$ (G" max)/° C. | 112 | 122 |

What is claimed is:

1. An adhesive composition, comprising: a curable epoxy prepolymer, a curing agent, and rubber particles having a core/shell structure;
   wherein the curable epoxy prepolymer is obtained by reacting (a), (b), and (c) in a reaction mixture containing (a), (b), (c), and (d):
      (a) at least one epoxy resin having at least two 1,2-epoxy groups per molecule;
      (b) at least one polyetherdiamine or polyethertriamine;
      (c) at least one carboxyl-terminated butadiene-acrylonitrile copolymer (CTBN) or epoxy resin adduct thereof; and
      (d) said rubber particles having a core/shell structure;
   wherein a total of epoxy groups in the reaction mixture is in excess relative to a total of epoxy-reactive groups in the reaction mixture;
   wherein the reaction mixture does not contain a diglycidyl ether epoxy resin which is solid at room temperature; and
   wherein a cured product of the adhesive composition has: a modulus of elasticity of <800 MPa and/or a glass transition temperature $T_g$ of >100° C.

2. The adhesive composition according to claim 1, characterized in that:
   (a) the at least one epoxy resin having at least two 1,2-epoxy groups per molecule is a diglycidyl ether epoxy resin, which is liquid at room temperature; and/or
   (b) the at least one polyetherdiamine or polyethertriamine is an amino-terminated polypropylene oxide.

3. The adhesive composition according to claim 1, characterized in that:
   (c) the at least one carboxyl-terminated butadiene-acrylonitrile copolymer (CTBN) or epoxy resin adduct thereof is an epoxy resin adduct thereof.

4. The adhesive composition according to claim 1, characterized in that the curing agent is a latent curing agent.

5. The adhesive composition according to claim 1, which further comprises a curing accelerator.

6. The adhesive composition according to claim 1, which further comprises at least one filler.

7. A method for producing a cured adhesive composition, which comprises:
   (a) providing an adhesive composition according to claim 1; and
   (b) partially or fully curing the adhesive composition through exposure to conditions suitable for curing the adhesive composition.

8. A method for bonding at least two components, which comprises:
   (a) applying an adhesive composition according to claim 1 to one or both of the components to be bonded;
   (b) bringing the components into contact such that the adhesive composition is located between the two components; and
   (c) partially or fully curing the adhesive composition through exposure to conditions suitable for curing the adhesive composition.

9. A component obtained by the method according to claim 8.

* * * * *

UNITED STATES PATENT AND TRADEMARK OFFICE
CERTIFICATE OF CORRECTION

| | | |
|---|---|---|
| PATENT NO. | : 10,329,465 B2 | Page 1 of 1 |
| APPLICATION NO. | : 15/626266 | |
| DATED | : June 25, 2019 | |
| INVENTOR(S) | : Christian Holtgrewe et al. | |

It is certified that error appears in the above-identified patent and that said Letters Patent is hereby corrected as shown below:

In the Specification

Column 5, Line 57: Change "ANEW" to -- AHEW --.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*